US010457190B2

(12) United States Patent
Gault

(10) Patent No.: US 10,457,190 B2
(45) Date of Patent: Oct. 29, 2019

(54) EXPANDING HARD SIDE TRAILER

(71) Applicant: Robert L. Gault, Castle Rock, CO (US)

(72) Inventor: Robert L. Gault, Castle Rock, CO (US)

(*) Notice: Subject to any disclaimer, the term of this patent is extended or adjusted under 35 U.S.C. 154(b) by 0 days.

(21) Appl. No.: 16/256,625

(22) Filed: Jan. 24, 2019

(65) Prior Publication Data
US 2019/0225134 A1 Jul. 25, 2019

Related U.S. Application Data

(60) Provisional application No. 62/621,496, filed on Jan. 24, 2018.

(51) Int. Cl.
B60P 3/34 (2006.01)
(52) U.S. Cl.
CPC ....................... B60P 3/34 (2013.01)
(58) Field of Classification Search
CPC ........................................................ B60P 3/34
USPC ..................... 296/165, 173, 26.06
See application file for complete search history.

(56) References Cited

U.S. PATENT DOCUMENTS

| | | | |
|---|---|---|---|
| 2,656,213 A | 10/1953 | Harold | |
| 3,356,410 A * | 12/1967 | Wendell | B60P 3/34 296/26.04 |
| 3,375,035 A * | 3/1968 | Schultz | B60P 3/34 296/26.04 |
| 3,560,042 A * | 2/1971 | McCarthy | B60P 3/34 296/170 |
| 4,027,912 A * | 6/1977 | Pacca | B60P 3/38 296/160 |
| 4,165,117 A * | 8/1979 | Kaiser | B60P 3/34 296/169 |
| 5,080,426 A | 1/1992 | Johnson | |
| 6,017,080 A | 1/2000 | Gill | |
| 6,840,569 B1 * | 1/2005 | Leigh | B60P 3/34 296/173 |
| 7,150,483 B2 | 12/2006 | Rasmussen | |
| 7,942,464 B2 | 5/2011 | Schmidt | |
| 2013/0026780 A1 * | 1/2013 | Hanson | B60P 3/34 296/121 |

FOREIGN PATENT DOCUMENTS

GB 1155968 * 6/1969 ............... B60P 3/34

* cited by examiner

Primary Examiner — Jason S Morrow
(74) Attorney, Agent, or Firm — MP Patents, LLC

(57) ABSTRACT

A camper system is configurable between folded and expanded arrangements. The camper system includes a base frame, a floor substantially rigidly mounted to the base frame, a base wall rigidly coupled with the floor, substantially perpendicular thereto and having interior surfaces and exterior surfaces. First and second flanges project from the floor substantially perpendicular thereto and intersect at least one of the base wall interior surfaces. A first shell is pivotably coupled with the base wall along a first pivot axis. A second shell is pivotably coupled with the base wall along a second pivot axis parallel with the first pivot axis. A third shell is pivotably coupled with the base wall along a third pivot axis perpendicular to the first and second pivot axes. A fourth shell is pivotably coupled with the first and second flanges along a fourth pivot axis parallel with the third pivot axis.

16 Claims, 11 Drawing Sheets

EXPANDING HARD SIDE TRAILER

CROSS REFERENCE TO RELATED APPLICATIONS

This application claims the priority benefit of U.S. Provisional Application No. U.S. 62/621,496 filed on Jan. 24, 2018 and entitled 'FOLD OUT HARD SIDE TRAILER.' The same is incorporated herein by reference in its entirety.

TECHNICAL FIELD

The disclosure relates to trailers such as those typically towed by a vehicle.

SUMMARY

The disclosure describes a camper trailer system. The camper trailer system includes a base frame including a hitch, at least one axle and at least one wheel. Substantially rigidly mounted to the base frame parallel with the at least one axle, a floor includes a perimeter and a base wall. The base wall includes a first side rigidly coupled with the floor substantially perpendicular thereto and has interior surfaces and exterior surfaces and a second side rigidly coupled with the floor substantially perpendicular thereto opposite the first side wall and having interior surfaces and exterior surfaces. A front side of the base wall is rigidly coupled with the floor substantially perpendicular thereto and has interior surfaces and exterior surfaces and extends substantially between the first side wall and the second side wall. A rear side of the base wall is rigidly coupled with the floor substantially perpendicular thereto, has interior surfaces and exterior surfaces, extends between the first side wall and the second side wall and includes an interruption. A first flange projects from floor substantially perpendicular thereto and intersects the interior surface of the first side of the base wall. A second flange projects from the floor substantially perpendicular thereto and intersects the interior surface of the second side of the base wall. The second flange is spaced from and substantially coplanar with the first flange. A first shell is pivotably coupled with the first side of the base wall, a second shell is pivotably coupled with the second side of the base wall, a third shell is pivotably coupled with the front side of the base wall and a fourth shell is pivotably coupled with the first and second flanges.

The disclosure also describes a camper system configurable between folded and expanded arrangements. The camper system includes a base frame, a floor substantially rigidly mounted to the base frame and a base wall rigidly coupled with the floor substantially perpendicular thereto. The base wall includes interior surfaces and exterior surfaces. A first flange projects from the floor substantially perpendicular thereto and intersects at least one of the base wall interior surfaces and a second flange projects from the floor substantially perpendicular thereto, intersecting at least one of the base wall interior surfaces. The second flange is spaced from and substantially coplanar with the first flange. A first shell is pivotably coupled with the base wall along a first pivot axis. A second shell is pivotably coupled with the base wall along a second pivot axis parallel with the first pivot axis at a position opposite the first shell and distal therefrom. A third shell is pivotably coupled with the base wall along a third pivot axis perpendicular to the first and second pivot axes. A fourth shell is pivotably coupled with the first and second flanges along a fourth pivot axis parallel with the third pivot axis.

Further, the disclosure describes a method for expanding a folded camper trailer system. The method includes providing the camper trailer system with a base frame, a floor, a base wall, a first shell, a second shell, a third shell and a fourth shell. The base frame includes a hitch, at least one axle and at least one wheel substantially rigidly mounted to the base frame parallel with the at least one axle. The fourth shell is pivoted about a first pivot axis. The third shell is pivoted about a second pivot axis parallel with the first pivot axis. The first shell is pivoted about a third pivot axis perpendicular to the first and second pivot axes. The second shell is pivoted about a fourth pivot axis parallel with the third pivot axis and perpendicular to the first and second pivot axes.

BRIEF DESCRIPTION OF THE FIGURES

The summary above, as well as the following detailed description of illustrative embodiments, is better understood when read in conjunction with the appended figures. For the purpose of illustrating the disclosure, example constructions are shown in the figures. However, the disclosure is not limited to specific methods and instrumentalities disclosed herein. Moreover, those having ordinary skill in the art will understand that the figures are not to scale. Wherever possible, like elements have been indicated by identical numbers.

Embodiments of the disclosure will now be described, by way of example only, with reference to the following diagrams wherein.

DETAILED DESCRIPTION

Figure 1:
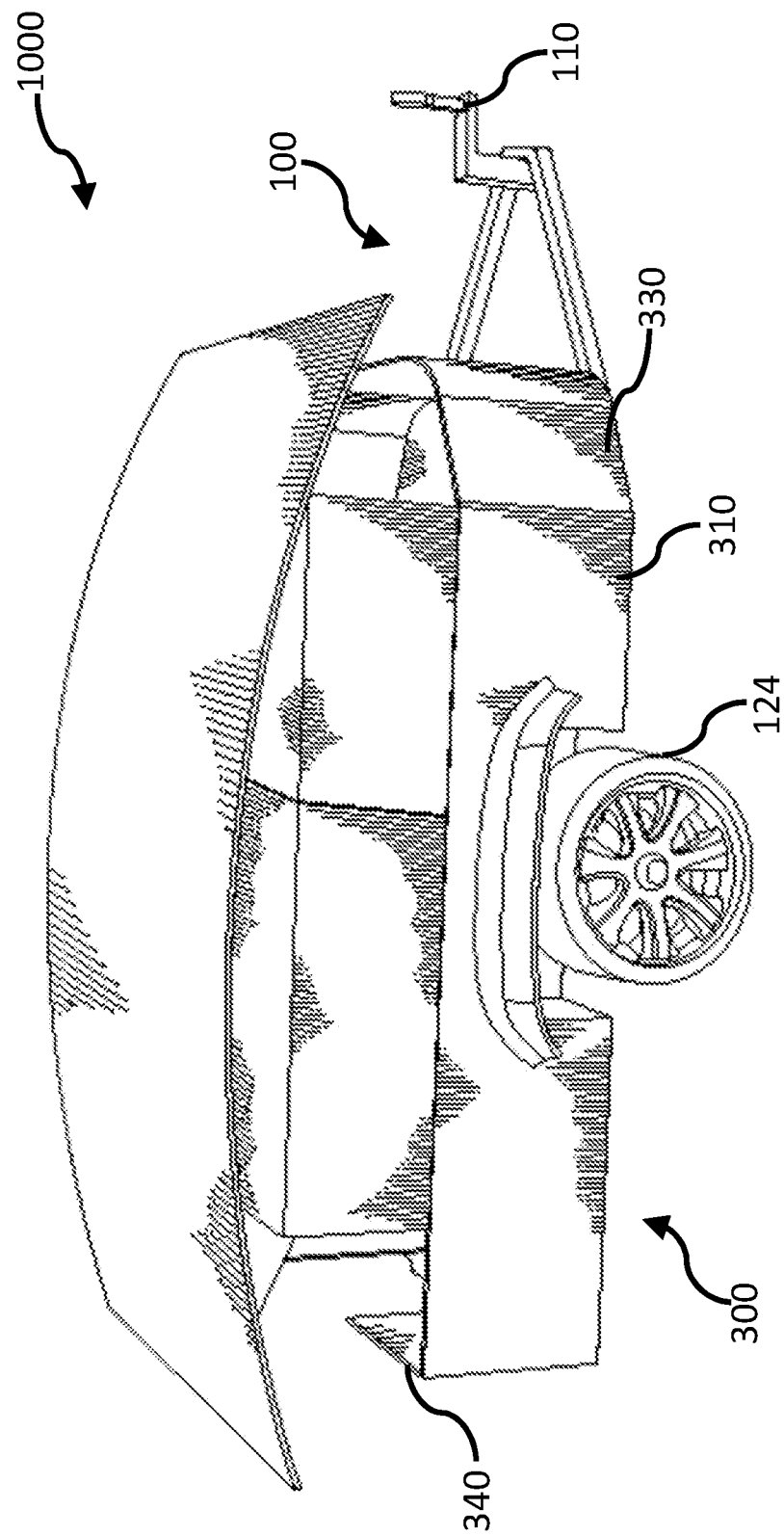
FIG. 1 illustrates a side view of an example camper trailer system.

The following detailed description illustrates embodiments of the disclosure and manners by which they may be implemented. Although the best mode of carrying out disclosed systems and methods has been described, those of ordinary skill in the art would recognize that other embodiments for carrying out or practicing disclosed systems and methods are also possible.

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

Traditional camping trailers may be difficult and frustrating to use. Traditional pop-up lift mechanisms frequently fail to support the roof section of the trailer. Further, pop-ups are typically constructed from tent fabric rather than hardshell construction making them less secure as well as more susceptible to inadvertent tearing or puncture. Known folding hard side trailers do not include "pop out" expansions. Other trailer varieties are not designed for folding or other compacting making them difficult to transport.

Embodiments of the disclosure provide a camper system and/or a camper trailer system configured for conversion between folded and expanded arrangements.

Embodiments of the disclosure substantially eliminate, or at least partially address, problems in the prior art, enabling simplified transport of a secure, durable camping shelter with suitable interior living and storage space.

Additional aspects, advantages, features and objects of the disclosure will be made apparent from the figures and the detailed description of the illustrative embodiments construed in conjunction with the appended claims that follow. It will be appreciated that described features are susceptible to being combined in various combinations without departing from the scope of the disclosure as defined by the appended claims.

Referring now to the figures, particularly by their reference numbers, FIGS. 1-11 illustrate an example camper trailer system 1000. Camper trailer system 1000 includes a base frame 100 (FIG. 1) having a hitch 110, at least one axle (not visible) and one or more wheels 124, 126 mounted to the axle. A floor 200 (FIG. 2) having a perimeter is substantially rigidly mounted to base frame 100 in a generally horizontal orientation or otherwise parallel with the at least one axle. A base wall 300 is rigidly coupled with floor 200 at or adjacent to the floor's perimeter and may be observed to have first 310, second 320, front 330 and rear 340 sides. Rear side 340 of base wall 300 may further include an interruption 342.

First side 310, second side 320, front side 330 and rear side 340 are substantially perpendicular to floor 200 and have interior surfaces and exterior surfaces. In an example, first, second, front and rear sides 310, 320, 330 and 340 form an angle of between about 87 degrees and about 90 degrees with floor 200. First, second, front and rear sides 310, 320, 330 or 340 may each take any of a variety of shapes or dimensions including but not limited to rectilinear, curvilinear and a combination of these and may meet in a variety of ways including but not limited to right angles, curved corners or a combination of these.

A first wheel well (not visible) in the form of a first raised, hollow portion projects from floor 200 adjacent to first side 310 of the base wall. A second wheel well 220 (FIG. 7) in the form of a second raised, hollow portion projects from floor 200 adjacent to second side 320 of the base wall.

First 350 and second 360 flanges project from floor 200 and are spaced apart and substantially mutually coplanar. For example, first flange 350 and second flange 360 define an angle of less than about 3 degrees therebetween. In an example, first and second flanges 350 and 360 are substantially perpendicular to floor 200 and intersect the interior surface of the base wall. In a further example, first flange 350 may meet floor 200 at an angle of between about 87 degrees and about 90 degrees and second flange 360 may meet floor 200 at an angle of between about 87 degrees and about 90 degrees.

A first shell 400, which may include an outer wall 410 (FIG. 3), is pivotably coupled with first side 310 of the base wall along a first pivot axis 401. In an example, first pivot axis 401 is perpendicular to an axle of camper trailer system 1000. A second shell 500, which may include an outer wall 510, is pivotably coupled with second side 320 of the base wall along a second pivot axis 501 (FIG. 11) parallel with first pivot axis 401. A third shell 600, which may include a front wall 610 and two side walls 620 and 630, is pivotably coupled with front side 330 of the base wall along a pivot axis 601 (FIG. 4) perpendicular to first and second axes 401 and 501. In an example, pivot axis 601 is generally parallel with an axle of camper trailer system 1000. A fourth shell 700, which may include a rear wall 710 and two side walls 720 and 730, is pivotably coupled with first and second flanges 350 and 360 along a pivot axis 701 generally parallel with third axis 601.

First shell 400 may further include a container portion 430 (FIG. 8) defining an interior space. Container portion 430 protrudes from outer wall 410 of first shell 400 and, in the expanded arrangement, protrudes generally away from the exterior of first side 310 of the base wall. A flap portion 420 (FIG. 7) may be hingedly coupled to container portion 430 of first shell 400 and configured for pivoting about a pivot axis generally parallel with pivot axis 401 of first shell 400 and generally normal to first and second flanges 350 and 360. Flap portion 420 may be substantially coplanar with first side 310 of the base wall in the expanded arrangement and include an edge forming an oblique angle with floor 200 in the expanded arrangement.

A first support panel 370 (FIG. 9) may be pivotably coupled with first side 310 of the base wall for pivoting, about an axis parallel with axes 401 and 501, between a position perpendicular to floor 200 and a position parallel with floor 200. In an example, first support panel 370 provides a shelf suitable for supporting a sitting, reclining, prone or supine person. In another example, first support panel 370 may be pivotably coupled with container portion 430 or other part of first shell 400.

Second shell 500 may further include a container portion 530 (FIG. 11) defining an interior space. Container portion 530 protrudes from outer wall 510 of second shell 500 and, in the expanded arrangement, protrudes generally away from the exterior of second side 320 of the base wall. A flap portion 520 (FIG. 6) may be hingedly coupled to container portion 510 of second shell 500 and configured for pivoting about a pivot axis generally parallel with pivot axis 501 of second shell 500 and generally normal to first and second flanges 350 and 360. Flap portion 520 of second shell 500 may be substantially coplanar with second 320 side of the base wall in the expanded arrangement and include an edge forming an oblique angle with floor 200 in the expanded arrangement.

A second support panel 380 may be pivotably coupled with second side 320 of the base wall for pivoting, about an axis parallel with axes 401 and 501, between a position perpendicular to floor 200 and a position parallel with floor 200. In an example, second support panel 380 provides a shelf suitable for supporting a sitting, reclining, prone or supine person. In another example, second support panel 380 may be pivotably coupled with container portion 530 or other part of second shell 500.

Third shell 600 further includes a front wall 610 which is generally parallel with floor 200 in the folded arrangement and generally perpendicular to floor 200 in the expanded arrangement. Further, front wall 610 of third shell 600 is substantially perpendicular to front side 330 of the base wall in the folded arrangement and substantially coplanar with front side 330 of the base wall in the expanded arrangement.

Third shell 600, including front wall 610 and side walls 620 and 630, is configured to surround or partially cover forward portions of first 400 and second 500 shells in the folded arrangement. For example, third shell 600 is configured to cover upper portions of the forward portions of first and second shells 400 and 500 while other features such as floor 200 contain or otherwise cover lower portions thereof.

Fourth shell 700 further includes a rear wall 710 which is generally parallel with floor 200 in the folded arrangement and generally perpendicular to floor 200 in the expanded arrangement. Further, rear wall 710 of fourth shell 700 is substantially perpendicular to rear side 340 of the base wall in the folded arrangement and substantially coplanar with rear side 340 of the base wall in the expanded arrangement.

A door 740 is hingedly coupled with rear wall 710 of fourth shell 700 about a hinge axis generally normal to first and second flanges 350 and 360 in the folded arrangement and generally parallel therewith in the expanded arrangement. In an example, door 740 is configured to span and substantially seal interruption 342 of rear side 340 of the base wall in the expanded arrangement.

Fourth shell 700, including rear wall 710 and side walls 720 and 730, is configured to partially surround or cover rearward portions of first and second shells 400 and 500 in the folded arrangement. For example, fourth shell 700 is configured to cover upper portions of the rearward portions of first and second shells 400 and 500 while other features such as floor 200 contain or otherwise cover lower portions thereof.

An edge 605 (FIG. 4) of third shell 600 is configured to meet with an edge 705 of fourth shell 700 in the folded arrangement and be distal therefrom in the expanded arrangement. Together, third shell 600 and fourth shell 700 cover, substantially completely, first shell 400 and second shell 500 such that the first and second shells are at least partially nested within third and fourth shells 600 and 700 as shown by way of example in FIG. 2. For example, third shell 600 and fourth shell 700 cover first and second shells 400 and 500 except for small gaps between adjacent edges 605 and 705.

A plurality of shelves 750 (FIG. 8) may be coupled with or otherwise provided to an interior of fourth shell 700. In an example, shelves 750 are provided to an interior of rear wall 710 of fourth shell 700.

While shells 400, 500, 600 and 700 may be formed from any of a variety of materials, in an example, shells 400, 500, 600 and 700 and associated subcomponents are formed from a hard, substantially rigid, durable material such as wood, metal, plastic, carbon-fiber or a combination of these.

A roof 800 (FIGS. 1, 10 & 11) may be provided to rest on third and fourth shells 600 and 700 in the folded arrangement and to rest on edges of first 400, second 500, third 600 and fourth 700 shells in the expanded arrangement. In an example, roof 800 may be coupled with one or more of shells 400, 500, 600 and 700 with hardware such as one or more tracks and one or more wheels such that roof 800 glides and/or articulates along one or more surfaces or edges of shells 400, 500, 600 and 700 during pivoting of shells 400, 500, 600 and 700 between folded and expanded arrangements.

In an example, meeting top edges of flaps 420 and 520 and side walls 620, 630, 720 and 730 maintain the aforementioned oblique angles of flaps 420 and 520 such that roof 800, when resting on the top edges of flaps 420 and 520 and side walls 620, 630, 720 and 730, is angled either away from or towards hitch 110. In an example, roof 800 may be angled between about 5 and about 45 degrees relative to floor 200. In another example, roof 800 is generally parallel with the floor within about 3 degrees.

Trailer camper 1000 may be constructed in any of a variety of dimensions suitable for towing behind a human-operated vehicle and for accommodating one or more humans. In another example, trailer camper 1000 may be constructed to a scale suitable for use with models and/or toy vehicles.

In an example, trailer camper 1000 may be provided as a camper without a hitch, wheels or an axle so that it is suitable for placement in the bed of a truck or a supporting surface of another pre-existing vehicle.

According to an example method, a folded camper trailer system may be expanded. With a camper trailer system provided generally as described above and in a folded arrangement (FIGS. 1 & 2), fourth shell 700 is pivoted about axis 701 through a substantially right angle from a first position partially covering first and second shells 400 and 500 to a second position (FIG. 3). For example, fourth shell 700 may be pivoted between about 87 degrees and about 93 degrees.

Further, fourth shell 700 may be pivoted such that rear wall 710 thereof transitions from an orientation generally parallel with floor 200 to an orientation generally perpendicular to floor 200 and such that rear wall 710 thereof transitions from an orientation substantially perpendicular to rear side 340 of the base wall to an orientation substantially coplanar with rear side 340 of the base wall. For example, fourth shell 700 may transition from an orientation in which rear wall 710 thereof is angled up to about 3 degrees relative to floor 200 to an orientation in which rear wall 710 thereof is angled between about 87 degrees and about 93 degrees relative to floor 200. In a further example, fourth shell 700 may transition from an orientation in which rear wall 710 thereof transitions from an angle between about 87 degrees and about 90 degrees relative to front side 310 of the base wall.

Still further, fourth shell 700 is pivoted from a position wherein edge 705 of fourth shell 700 substantially meets with edge 605 of third shell 600 to a position wherein the edge of fourth shell 700 is distal from an edge of third shell 600. For example, fourth shell 700 may be pivoted from a position in which the edges 605 and 705 are substantially adjacent to one another or within about 2 cm to about 4 cm. By pivoting fourth shell 700, a rearward portion of first shell 400 and a rearward portion of second shell 500 are uncovered (FIG. 3).

Figure 3:
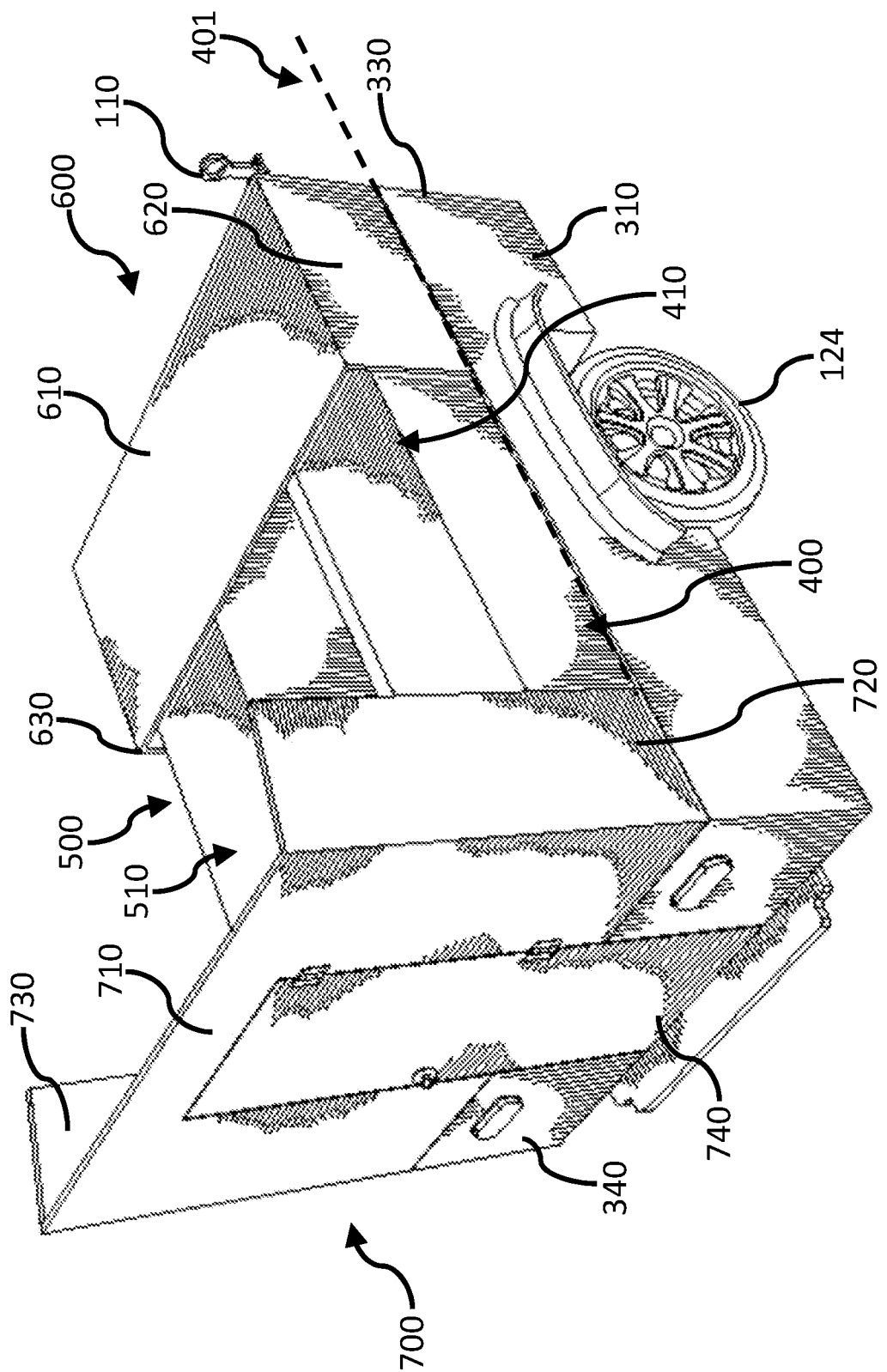
FIG. 3 illustrates a rear perspective view of the camper trailer system of FIGS. 1 & 2 in a partially expanded arrangement.
Figure 4:
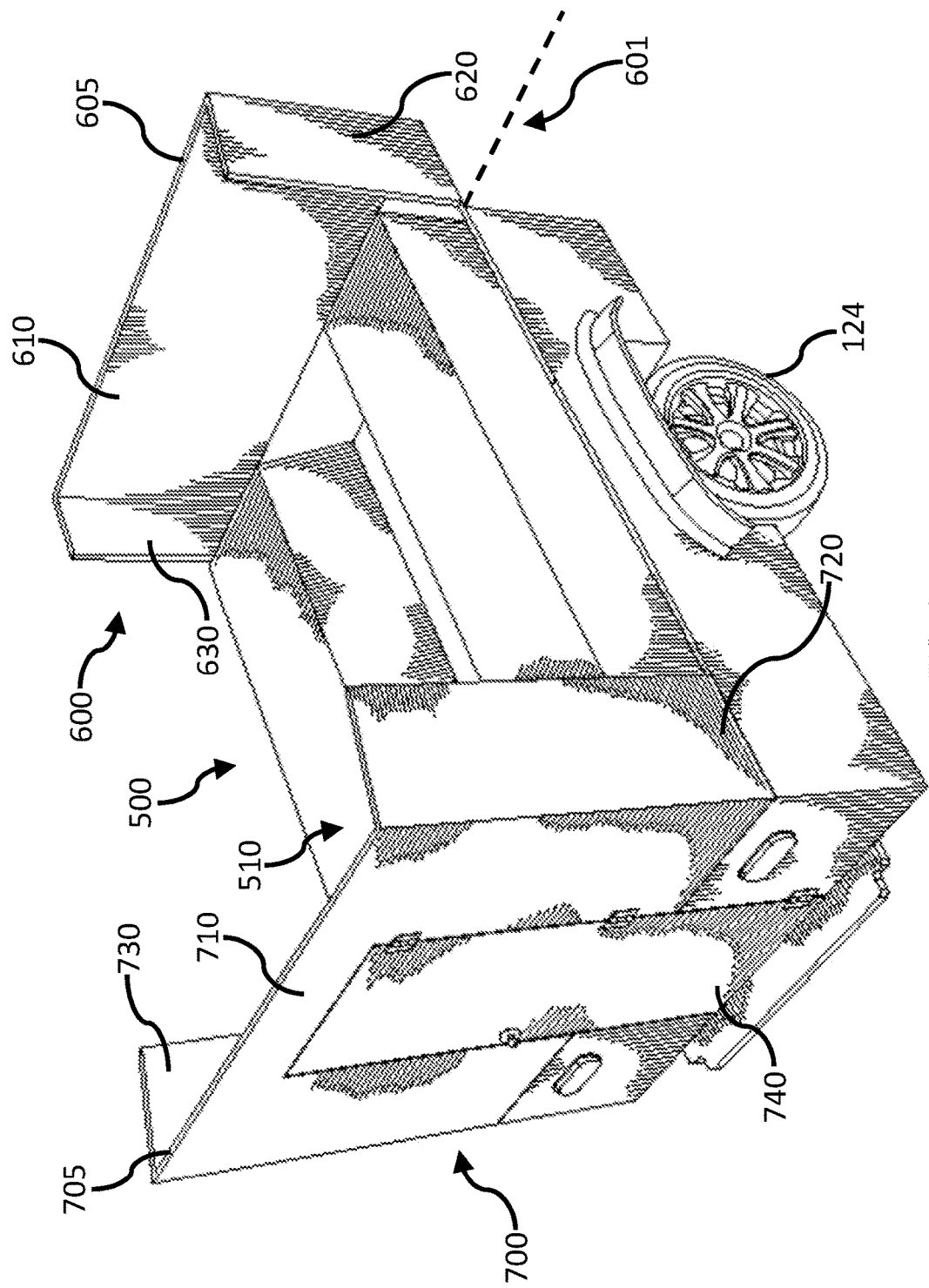
FIG. 4 illustrates a rear perspective view of the camper trailer system of FIGS. 1-3 in a partially expanded arrangement.
Figure 5:
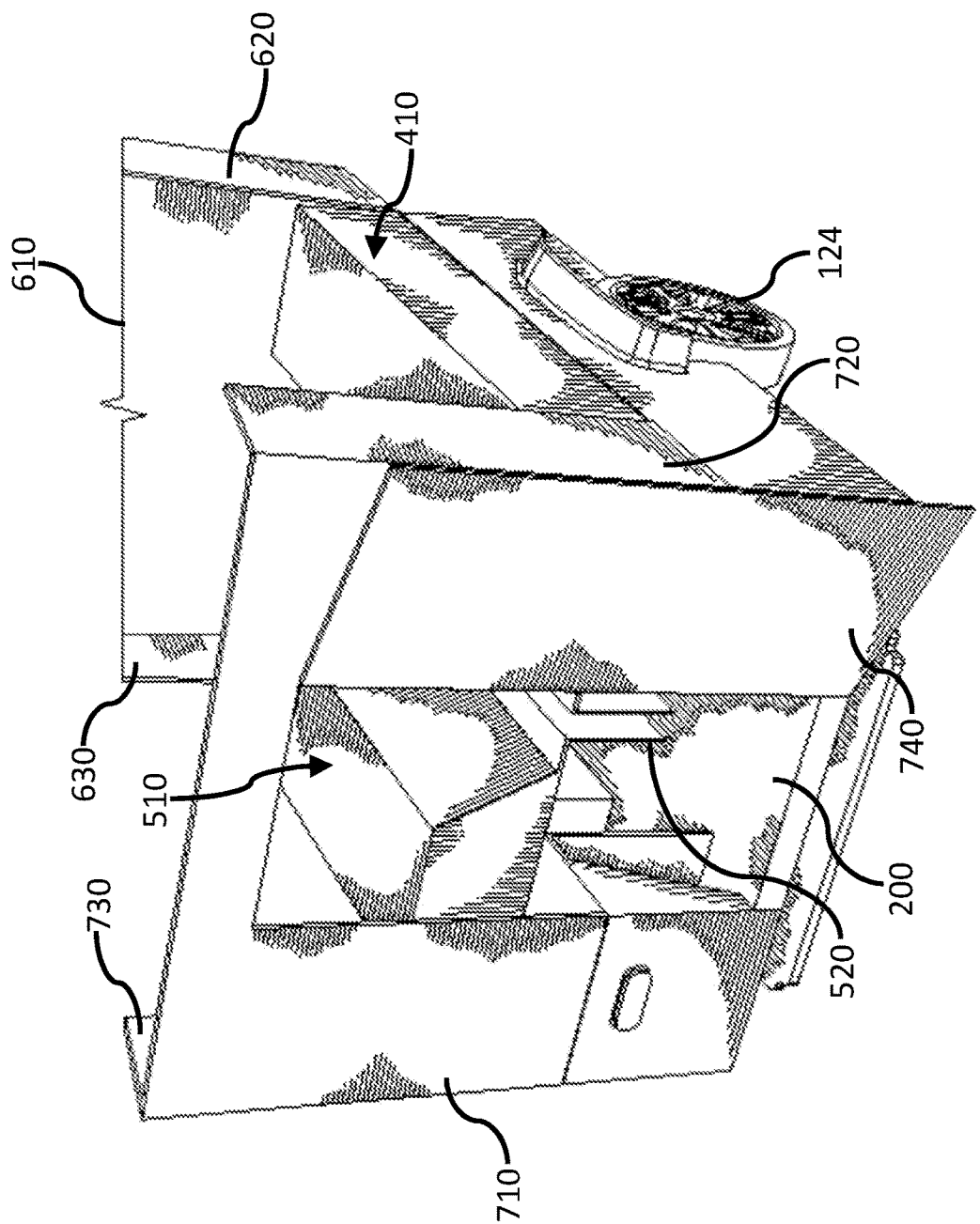
FIG. 5 illustrates a rear perspective view of the camper trailer system of FIGS. 1-4 in a partially expanded arrangement.

Continuing the expansion, third shell 600 is pivoted about axis 601 through a substantially right angle from a first position partially covering first and second shells 400 and 500 (FIGS. 1-3) to a second position (FIGS. 4 & 5). For example, third shell 600 may be pivoted between about 87 degrees and about 93 degrees.

Further, third shell 600 may be pivoted such that front wall 610 thereof transitions from an orientation generally parallel with floor 200 to an orientation generally perpendicular to floor 200 and such that front wall 610 thereof transitions from an orientation substantially perpendicular to front side 310 of the base wall. For example, third shell 600 may transition from an orientation in which front wall 610 thereof is angled up to about 3 degrees relative to floor 200 to an orientation in which the front wall thereof is angled between about 87 degrees and about 90 degrees relative to floor 200. In a further example, third shell 600 may transition from an orientation in which front wall 610 thereof transitions from an angle between about 87 degrees and about 90 degrees relative to front side 310 of the base wall.

Still further, third shell 600 is pivoted from a position wherein edge 605 of third shell 600 substantially meets with edge 705 of fourth shell 700 to a position wherein the edge of third shell 600 is distal from an edge of fourth shell 700. For example, third shell 600 may be pivoted from a position in which edges 605 and 705 are substantially adjacent to one another or within about 2 cm to about 4 cm. By pivoting third shell 600, a forward portion of first shell 400 and a forward portion of second shell 500 are uncovered (FIG. 4).

Note that, without impacting the end result of the expanding, the order of pivoting third and fourth shells 600 and 700 may be reversed such that third shell 600 is pivoted first and then fourth shell 700 is pivoted.

Figure 6:
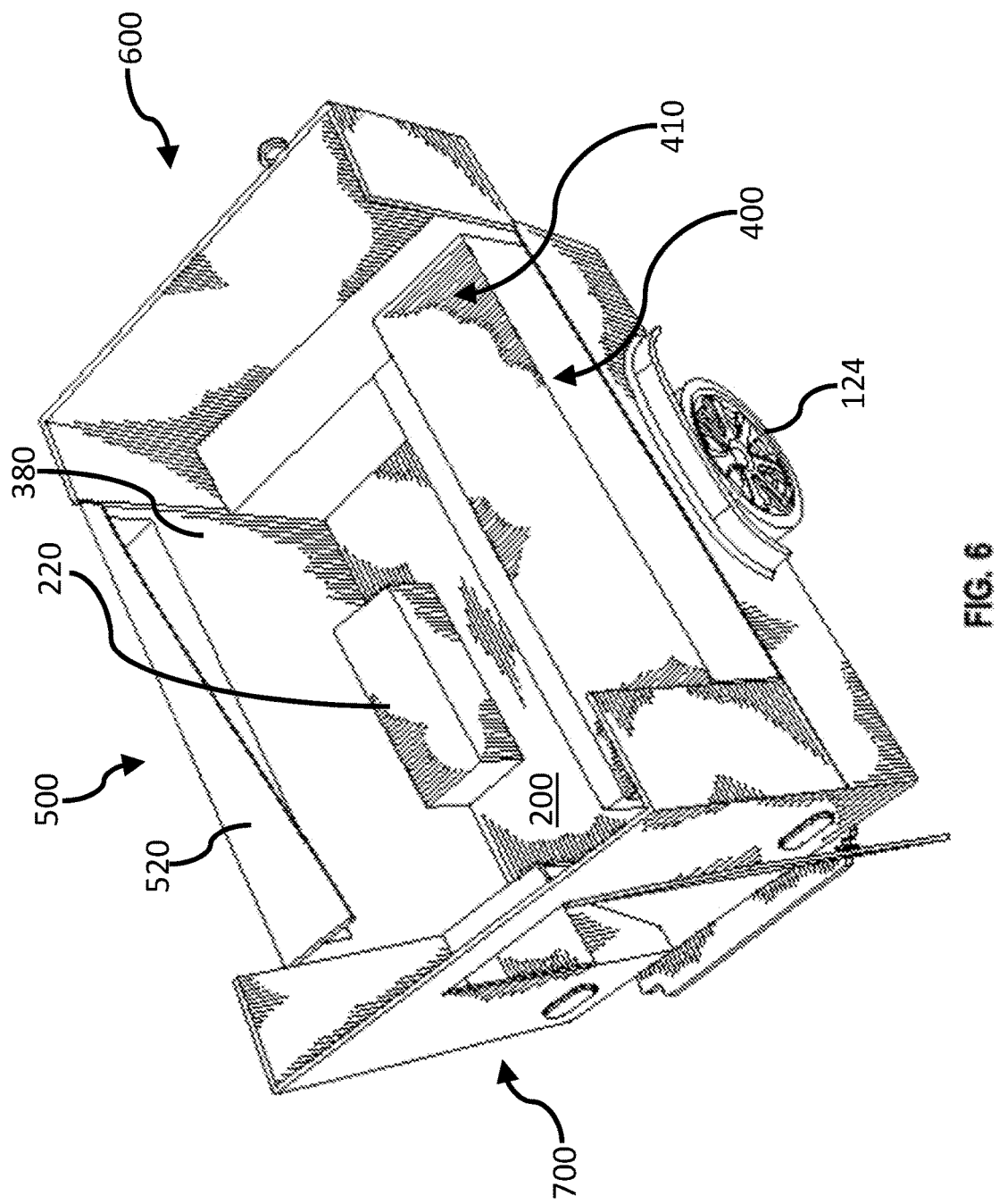
FIG. 6 illustrates a perspective overhead view of the camper trailer system of FIGS. 1-5 in a partially expanded arrangement.

Continuing again, second shell 500 is pivoted through a substantially right angle (FIG. 6). Then, first shell 400 is pivoted through a substantially right angle. For example, first and second shells 400 and 500 may be pivoted between about 87 degrees and about 93 degrees.

Figure 7:
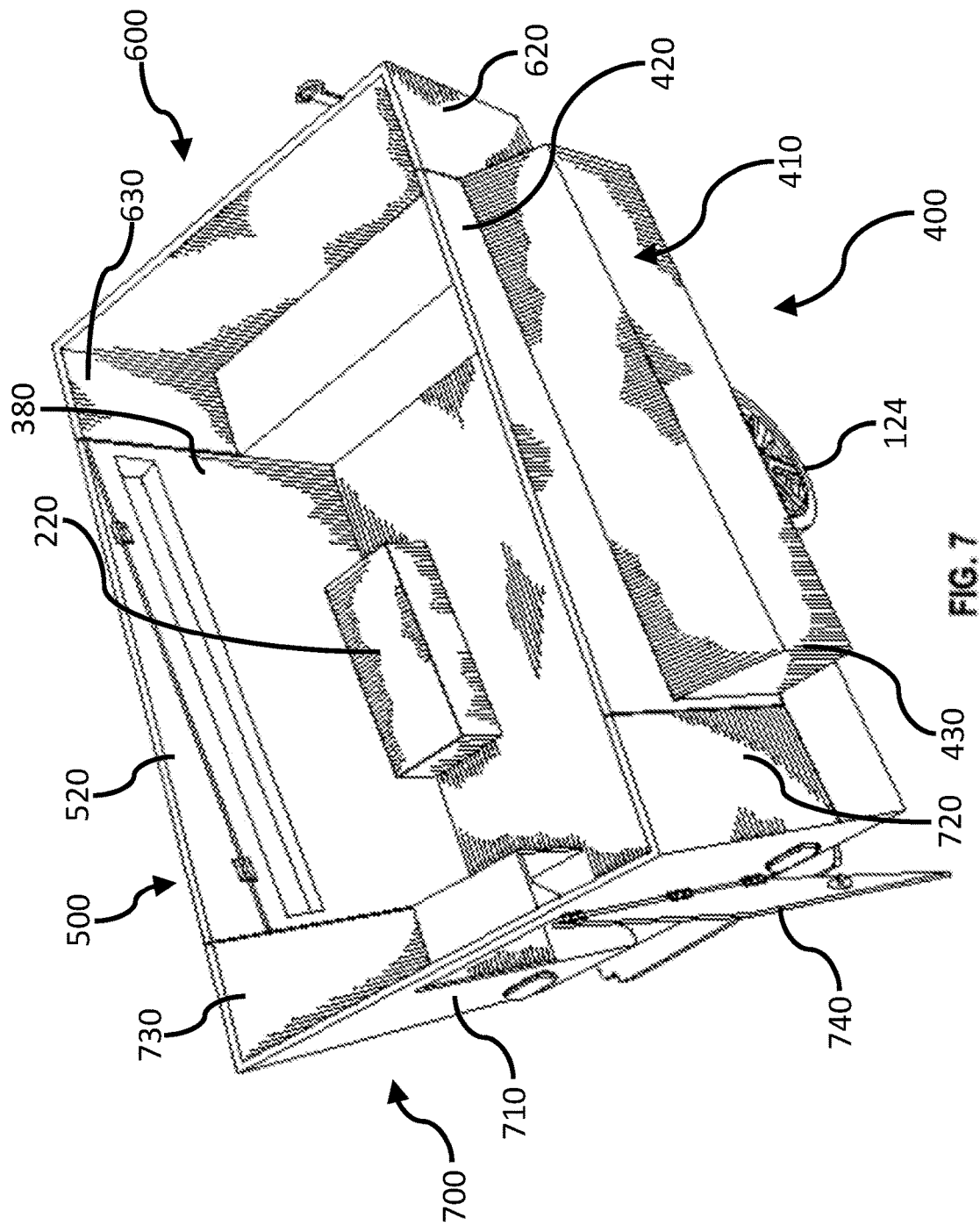
FIG. 7 illustrates a perspective overhead view of the camper trailer system of FIGS. 1-6 in an expanded arrangement.
Figure 8:
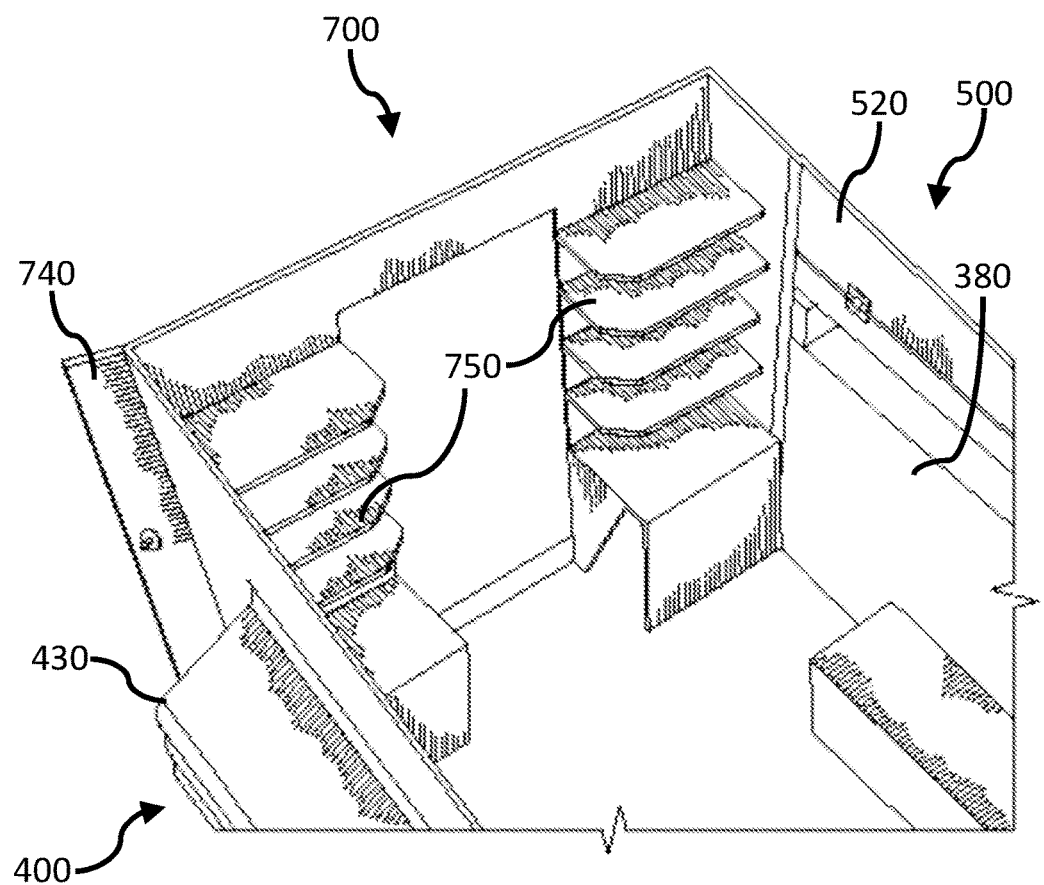
FIG. 8 illustrates a perspective overhead view of the camper trailer system of FIGS. 1-7 in an expanded arrangement.

Flap portion 520 of second shell 500 is pivoted about an axis generally normal to first and second flanges 350 and 360 to an orientation substantially coplanar with second side 320 of the base wall in which an edge thereof forms an oblique angle with floor 200 (FIG. 7). In an example, the pivot axis may be within about 3 degrees of normal to first and second flanges 350 and 360 and flap portion 520 may be within about 3 degrees of being coplanar.

Similarly, flap portion 420 of first shell 400 is pivoted about an axis generally normal to first and second flanges 350 and 360 to an orientation substantially coplanar with first side 310 of the base wall in which an edge thereof forms an oblique angle with floor 200. For example, the pivot axis of flap portion 420 may be within about 3 degrees of normal to first and second flanges 350 and 360 and flap portion 420 may be within about 3 degrees of being coplanar with first side 310 of the base wall.

Note that, without impacting the end result of the expanding, the order of pivoting first and second shells 400 and 500 may be reversed such that second shell 500 is pivoted first and then first shell 400 is pivoted.

Figure 9:
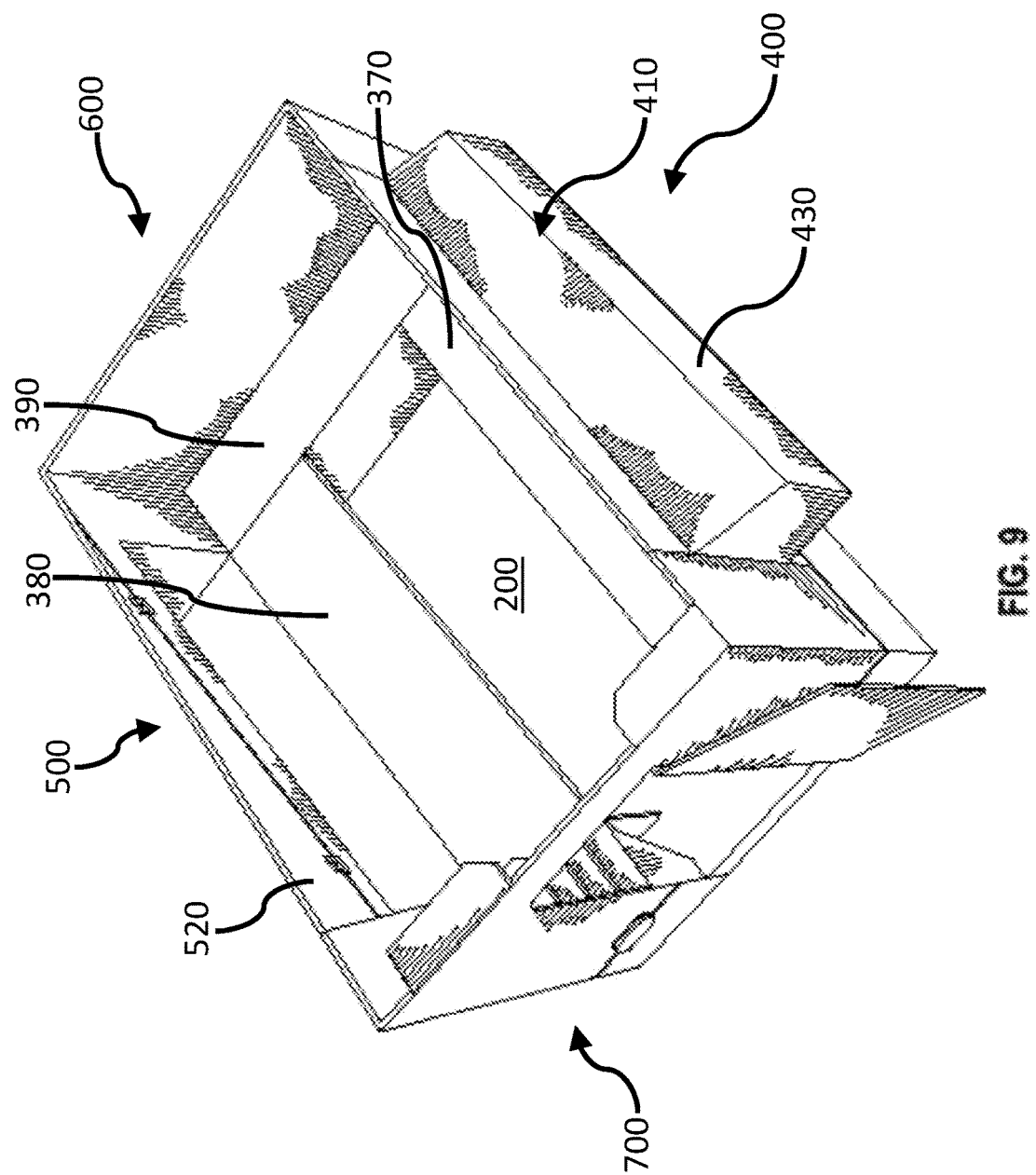
FIG. 9 illustrates a perspective overhead view of the camper trailer system of FIGS. 1-8 in an expanded arrangement.

First support panel 370 may optionally be pivoted from a position generally perpendicular to floor 200 to a position generally parallel with floor 200 (FIG. 9). For example, the first support panel may be pivoted from a position angled from about 87 degrees to about 90 degrees relative to the floor to a position angled up to about 3 degrees relative to floor 200.

Second support panel 380 may optionally be pivoted from a position generally perpendicular to floor 200 to a position generally parallel with floor 200 (FIG. 9). For example, second support panel 380 may be pivoted from a position angled from about 87 degrees to about 90 degrees relative to floor 200 to a position angled up to about 3 degrees relative to floor 200.

Figure 10:
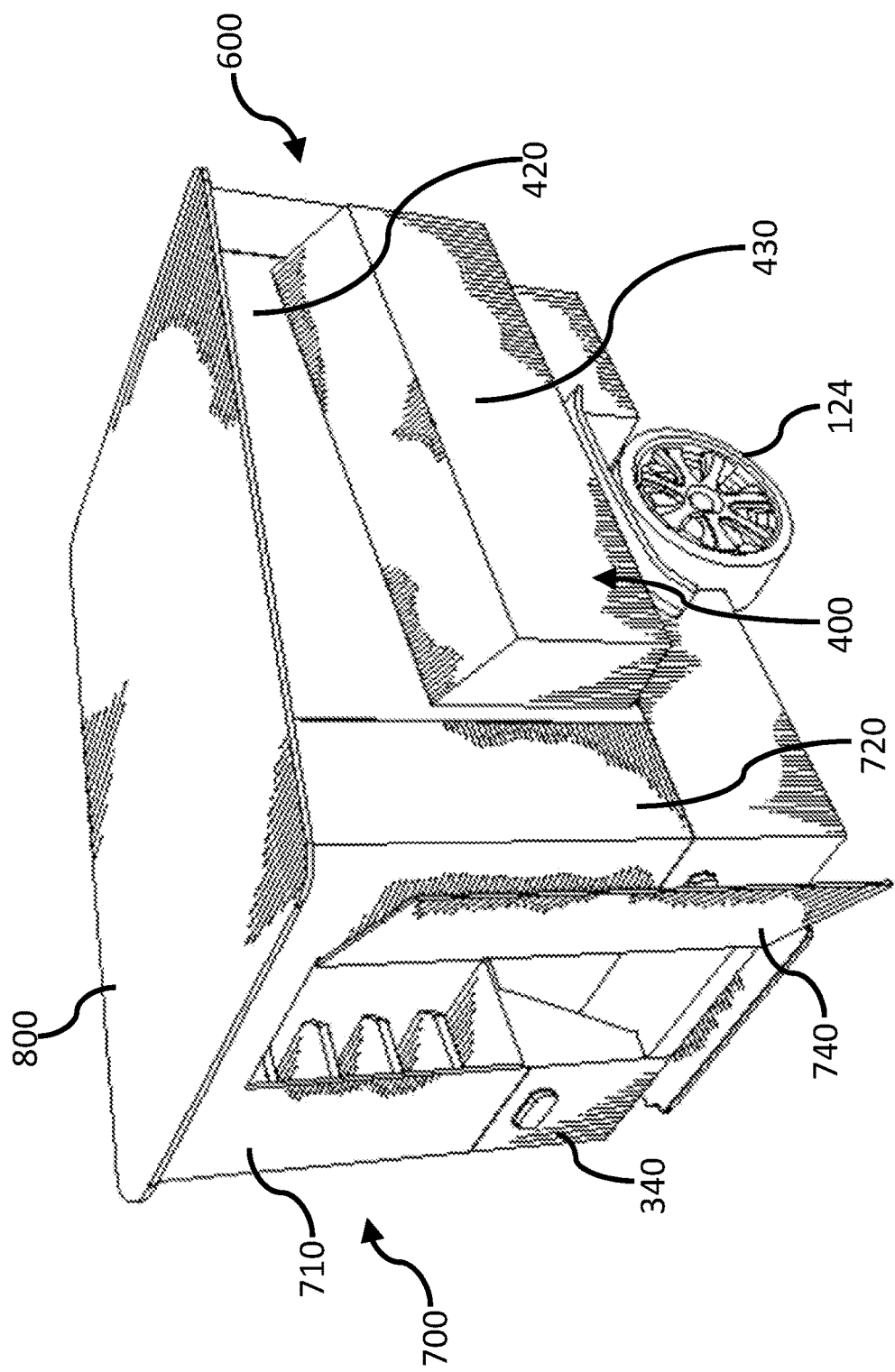
FIG. 10 illustrates a rear perspective view of the camper trailer system of FIGS. 1-9 in an expanded arrangement.

Further, a roof may be elevated so as to rest on or just above edges of the first, second, third and fourth shells 400, 500, 600 and 700 (FIG. 10). For example, roof 800 may be spaced from these edges by one or more wheels and/or one or more tracks.

Figure 11:
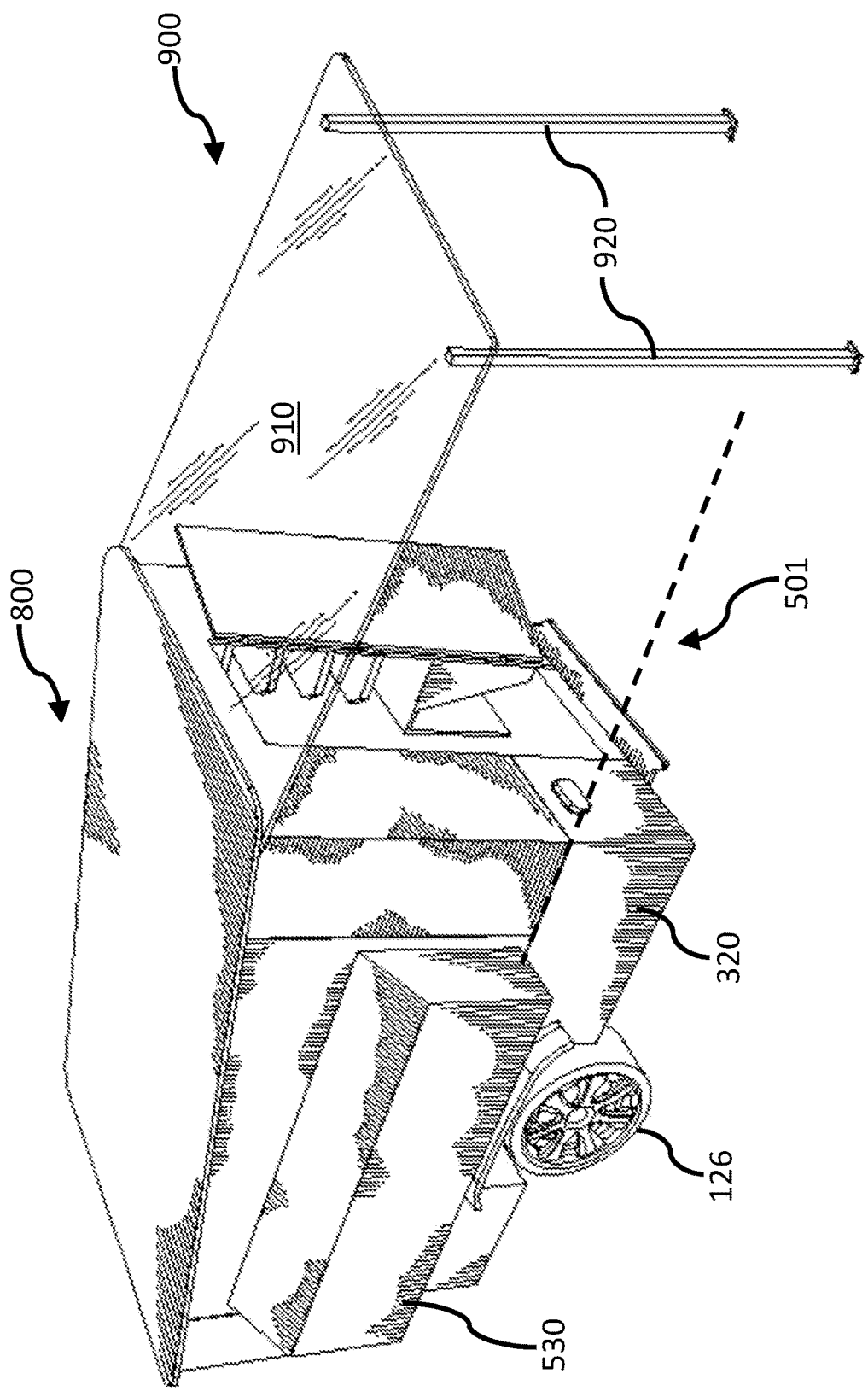
FIG. 11 illustrates a rear perspective view of the camper trailer system of FIGS. 1-10 in an expanded arrangement.

Still further, a covered extension 900 having an awning or canopy 910 supported by legs 920 may be provided with or assembled to camper trailer 1000 (FIG. 11).

The actions described above with respect to a method for expanding a camper trailer are only illustrative and other alternatives can also be provided where one or more actions are added, one or more actions are removed, or one or more actions are provided in a different sequence without departing from the scope of the claims herein.

According to an example method, an expanded camper trailer system may be folded. Initially, a camper trailer system may be provided in an expanded arrangement (FIG. 10) arrived at, for example, by the above-described method for expanding a camper trailer system. Generally, the actions described above with respect to the method for expanding a camper trailer are reversed and/or inverted.

First support panel 370 and second support panel 380 may be pivoted from a position parallel with floor 200 (FIG. 9) to a position perpendicular to floor 200 (FIGS. 7 & 8), if necessary. For example, in the event that first and second support panels 370 and 380 are already perpendicular to floor 200, it may be unnecessary to pivot the same.

Flap portion 420 of first shell 400 is pivoted about an axis generally normal to first and second flanges 350 and 360 to an orientation substantially perpendicular to first side 310 of the base wall and substantially parallel with floor 200. For example, the pivot axis may be within about 3 degrees of normal to first and second flanges 350 and 360, flap portion 420 may be pivoted to an orientation angled between about 87 degrees and about 90 degrees relative to first side 310 of the base wall and flap portion 420 may be pivoted to an orientation angled less than about 3 degrees relative to floor 200.

Further, first shell 400 is pivoted through a substantially right angle such that outer wall 410 thereof transitions from an orientation generally perpendicular to floor 200 (FIGS. 7 & 8) to an orientation generally parallel with floor 200 (FIG. 6) and substantially perpendicular to first side 310 of the base wall. For example, first shell 400 may be pivoted between about 87 degrees and about 93 degrees. In another example, first shell 400 may transition from an orientation in which outer wall 410 is angled from about 87 degrees to about 90 degrees relative to floor 200 to an orientation in which outer wall 410 is angled less than about 3 degrees relative to floor 200. In a further example, first shell 400 may transition to an orientation in which outer wall 410 is angled from about 87 degrees to about 90 degrees relative to front side wall 310.

Flap portion 520 of second shell 500 is pivoted about an axis generally normal to first and second flanges 350 and 360 to an orientation substantially perpendicular to second side 320 of the base wall and substantially parallel with floor 200 (FIG. 6). For example, the pivot axis may be within about 3 degrees of normal to first and second flanges 350 and 360, flap portion 520 may be pivoted to an orientation angled between about 87 degrees and about 90 degrees relative to second side 320 of the base wall and flap portion 520 may be pivoted to an orientation angled less than about 3 degrees relative to floor 200.

Continuing the folding, second shell 500 is pivoted through a substantially right angle such that outer wall 510 thereof transitions from an orientation generally perpendicular to floor 200 (FIG. 6) to an orientation generally parallel with floor 200 and substantially perpendicular to second side 320 of the base wall (FIGS. 4 & 5). For example, second shell 500 may be pivoted between about 87 degrees and about 93 degrees. In another example, second shell 500 may transition from an orientation in which outer wall 510 is angled from about 87 degrees to about 90 degrees relative to floor 200 to an orientation in which outer wall 510 is angled less than about 3 degrees relative to floor 200. In a further example, second shell 500 may transition to an orientation in which outer wall 510 is angled from about 87 degrees to about 90 degrees relative to front side wall 310.

Note that, without impacting the end result of the folding, the order of pivoting first and second shells 400 and 500 may be reversed such that second shell 500 is pivoted first and then first shell 400 is pivoted.

Continuing again, third shell 600 is pivoted through a substantially right angle such that a front wall 610 thereof transitions from an orientation generally perpendicular to floor 200 (FIG. 4) to an orientation generally parallel with floor 200 and such that front wall 610 thereof transitions to an orientation substantially perpendicular to front side 310 of the base wall (FIG. 3). For example, third shell 600 may be pivoted between about 87 degrees and about 93 degrees. In another example, third shell 600 may transition from an orientation in which front wall 610 thereof is angled from about 87 degrees to about 90 degrees relative to floor 200 to an orientation in which front wall 610 thereof is angled less than about 3 degrees relative to floor 200. In a further example, third shell 600 may transition to an orientation in which front wall 610 thereof is angled from about 87 degrees to about 90 degrees relative to front side wall 310. By pivoting third shell 600, a forward portion of first shell 400 and a forward portion of second shell 500 are covered.

Figure 2:
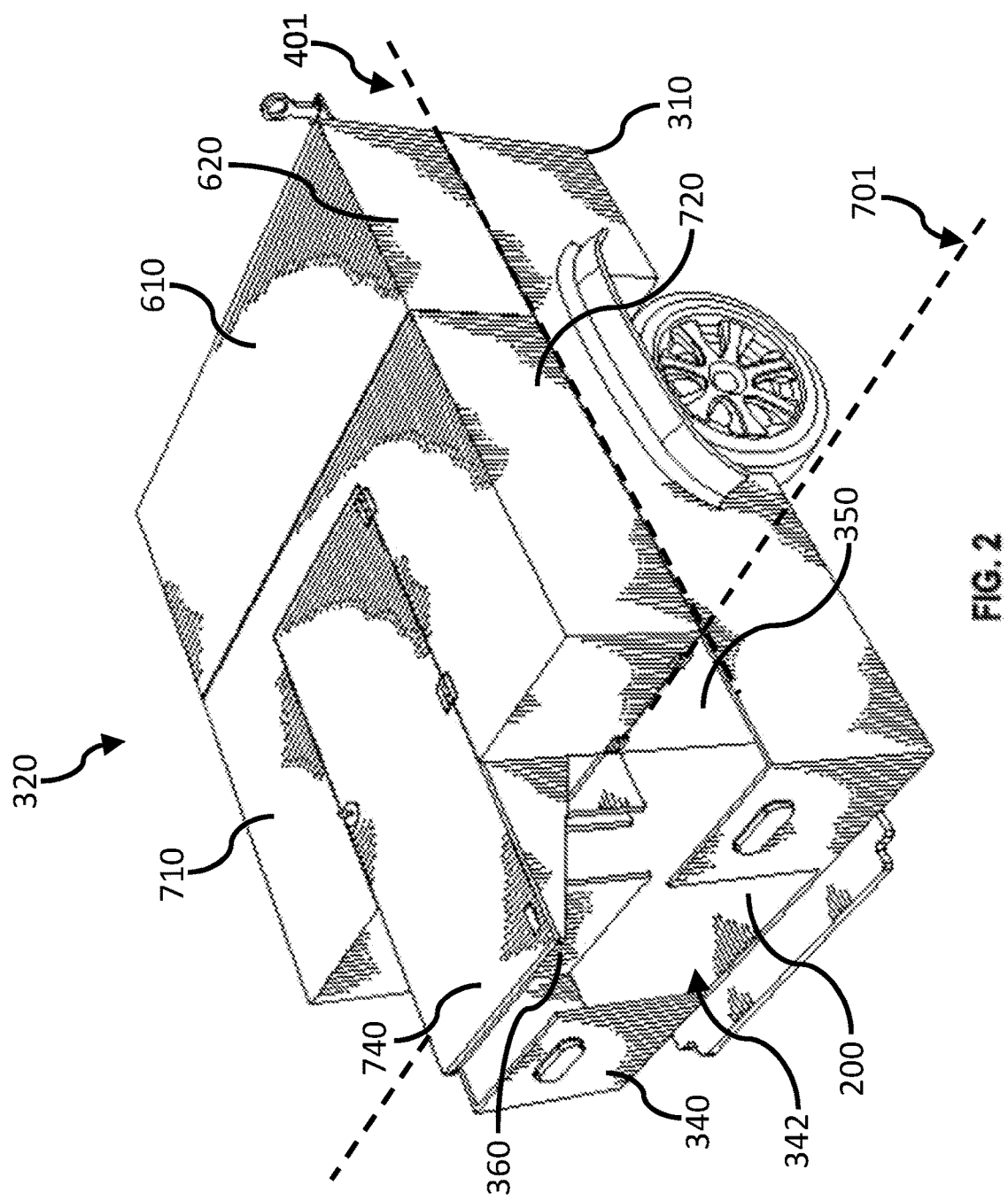
FIG. 2 illustrates a rear perspective view of the camper trailer system of FIG. 1.

Then, fourth shell 700 is pivoted through a substantially right angle such that a rear wall 710 thereof transitions from an orientation generally perpendicular to floor 200 (FIG. 3) to an orientation generally parallel with floor 200 and such that rear wall 710 thereof transitions from an orientation substantially coplanar with rear side 340 of the base wall to an orientation substantially perpendicular to rear side 340 of the base wall (FIG. 2). For example, fourth shell 700 may be pivoted between about 87 degrees and about 93 degrees. In another example, fourth shell 700 may transition from an orientation in which rear wall 710 thereof is angled between about 87 degrees and about 93 degrees relative to floor 200 to an orientation in which rear wall 710 is angled less than about 3 degrees relative to floor 200. In a further example, fourth shell 700 may transition from an orientation in which rear wall 710 thereof is angled less than about 3 degrees relative to rear side 340 of the base wall to an orientation in which rear wall 710 thereof is angled between about 87 degrees and about 93 degrees relative to rear side 340 of the base wall. By pivoting fourth shell 700, a rearward portion of first shell 400 and a rearward portion of second shell 500 are covered.

Further, fourth shell 700 is pivoted from a position wherein an edge of fourth shell 700 is distal from an edge of third shell 600 to a position wherein the edge of fourth shell 700 meets with or is substantially adjacent to the edge of third shell 600 (FIGS. 1 & 2). For example, fourth shell 700 may be pivoted to a position in which the edges of third and fourth shells 600 and 700 are within about 2 cm to about 4 cm.

Note that, without impacting the end result of the folding, the order of pivoting third and fourth shells 600 and 700 may be reversed such that fourth shell 700 is pivoted first and then third shell 600 is pivoted.

In an example, in the case that fourth shell 700 is pivoted to cover portions of first shell 400 and second shell 500 before third shell 600 is pivoted, third shell 600 is pivoted from a position wherein an edge of third shell 600 is distal from an edge of fourth shell 700 to a position wherein the edge of third shell 600 meets with or is substantially adjacent to the edge of fourth shell 700. For example, third shell 600 may similarly be pivoted to a position in which edges of third and fourth shells 600 and 700 are within about 2 cm to about 4 cm.

After shells 400, 500, 600 and 700 are folded, roof 800 may be lowered to rest on walls 610 and 710 of third and fourth shells 600 and 700 (FIG. 1).

The actions described above with respect to a method for folding a camper trailer are only illustrative and other alternatives can also be provided where one or more actions are added, one or more actions are removed, or one or more actions are provided in a different sequence without departing from the scope of the claims herein.

Embodiments of the disclosure are susceptible to being used for various purposes, including, though not limited to, enabling users to transport of a secure, durable camping shelter with suitable interior living and storage space.

Modifications to embodiments of the disclosure described in the foregoing are possible without departing from the scope of the disclosure as defined by the accompanying claims. Expressions such as "including", "comprising", "incorporating", "consisting of", "have", "is" used to describe and claim disclosed features are intended to be construed in a non-exclusive manner, namely allowing for items, components or elements not explicitly described also to be present. Reference to the singular is also to be construed to relate to the plural.

What is claimed is:

1. A camper trailer system, comprising:
 a base frame including a hitch, at least one axle and at least one wheel;
 substantially rigidly mounted to the base frame parallel with the at least one axle, a floor having a perimeter;
 a base wall including:
  a first side rigidly coupled with the floor substantially perpendicular thereto and having interior surfaces and exterior surfaces;
  a second side rigidly coupled with the floor substantially perpendicular thereto, opposite the first side wall and having interior surfaces and exterior surfaces;
  a front side rigidly coupled with the floor substantially perpendicular thereto, having interior surfaces and exterior surfaces and extending substantially between the first side wall and the second side wall;
  a rear side rigidly coupled with the floor substantially perpendicular thereto, having interior surfaces and exterior surfaces and extending between the first side wall and the second side wall and having an interruption;
 a first flange projecting from the floor substantially perpendicular thereto and intersecting the interior surface of the first side of the base wall;
 a second flange projecting from the floor substantially perpendicular thereto and intersecting the interior surface of the second side of the base wall, the second flange being spaced from and substantially coplanar with the first flange;
 a first shell pivotably coupled with the first side of the base wall;

a second shell pivotably coupled with the second side of the base wall;

a third shell pivotably coupled with the front side of the base wall; and a fourth shell pivotably coupled with the first and second flanges.

2. The camper trailer system as set forth in claim 1, wherein the third shell further comprises a front wall generally parallel with the floor in the folded arrangement and generally perpendicular to the floor in the expanded arrangement.

3. The camper trailer system as set forth in claim 1, wherein the third shell is configured to cover forward portions of the first and second shells in the folded arrangement.

4. The camper trailer system as set forth in claim 1, wherein the fourth shell further comprises a rear wall generally parallel with the floor in the folded arrangement and generally perpendicular to the floor in the expanded arrangement.

5. The camper trailer system as set forth in claim 4, wherein the rear wall of the fourth shell is substantially perpendicular to the rear side of the base wall in the folded arrangement and substantially coplanar with the rear side of the base wall in the expanded arrangement.

6. The camper trailer system as set forth in claim 1, wherein the fourth shell is configured to cover rearward portions of the first and second shells in the folded arrangement.

7. The camper trailer system as set forth in claim 1, wherein an edge of the third shell is configured to meet with an edge of the fourth shell in the folded arrangement.

8. The camper trailer system as set forth in claim 7, wherein the edge of the third shell is distal from the edge of the fourth shell in the expanded arrangement.

9. A camper system configurable between folded and expanded arrangements, comprising:

a base frame;

a floor substantially rigidly mounted to the base frame;

a base wall rigidly coupled with the floor, substantially perpendicular thereto and having interior surfaces and exterior surfaces;

a first flange projecting from floor substantially perpendicular thereto and intersecting at least one of the base wall interior surfaces;

a second flange projecting from the floor substantially perpendicular thereto, and intersecting at least one of the base wall interior surfaces, the second flange being spaced from and substantially coplanar with the first flange;

a first shell pivotably coupled with the base wall along a first pivot axis;

a second shell pivotably coupled with the base wall along a second pivot axis parallel with the first pivot axis at a position opposite the first shell and distal therefrom;

a third shell pivotably coupled with the base wall along a third pivot axis perpendicular to the first and second pivot axes; and a fourth shell pivotably coupled with the first and second flanges along a fourth pivot axis parallel with the third pivot axis.

10. The camper trailer system as set forth in claim 9, wherein the third shell further comprises a wall generally parallel with the floor in the folded arrangement and generally perpendicular to the floor in the expanded arrangement.

11. The camper trailer system as set forth in claim 9, wherein the third shell is configured to cover forward portions of the first and second shells in the folded arrangement.

12. The camper trailer system as set forth in claim 9, wherein the fourth shell further comprises a wall generally parallel with the floor in the folded arrangement and generally perpendicular to the floor in the expanded arrangement.

13. The camper trailer system as set forth in claim 12, wherein the wall of the fourth shell is substantially perpendicular to the base wall in the folded arrangement and substantially coplanar with the base wall in the expanded arrangement.

14. The camper trailer system as set forth in claim 9, wherein the fourth shell is configured to cover rearward portions of the first and second shells in the folded arrangement.

15. The camper trailer system as set forth in claim 9, wherein an edge of the third shell is configured to meet with an edge of the fourth shell in the folded arrangement.

16. The camper trailer system as set forth in claim 9, wherein the edge of the third shell is distal from the edge of the fourth shell in the expanded arrangement.

* * * * *